United States Patent
Sinclair

[11] Patent Number: 6,131,934
[45] Date of Patent: Oct. 17, 2000

[54] BICYCLE REAR SUSPENSION SYSTEM

[76] Inventor: Christopher Jeffery Sinclair, 16795 McLaughlin Road, Caledon, Ontario, Canada, L0N 1C0

[21] Appl. No.: 09/215,331

[22] Filed: Dec. 18, 1998

[51] Int. Cl.⁷ .................................................. B62K 25/10
[52] U.S. Cl. ........................... 280/284; 280/283; 280/286
[58] Field of Search ..................................... 280/283–286

[56] References Cited

U.S. PATENT DOCUMENTS

| | | |
|---|---|---|
| D. 381,941 | 8/1997 | Chan . |
| D. 390,505 | 2/1998 | Shiau . |
| D. 390,506 | 2/1998 | Shiau . |
| 625,456 | 5/1899 | Mills . |
| 2,283,671 | 5/1942 | Finaly et al. . |
| 4,789,042 | 12/1988 | Pitts . |
| 5,217,241 | 6/1993 | Girvin ..................................... 280/284 |
| 5,316,327 | 5/1994 | Bell ........................................ 280/260 |
| 5,332,246 | 7/1994 | Buell ...................................... 280/284 |
| 5,335,929 | 8/1994 | Takagaki et al. ...................... 280/283 |
| 5,356,165 | 10/1994 | Kulhawik et al. ..................... 280/275 |
| 5,370,411 | 12/1994 | Takamiya et al. ..................... 280/284 |
| 5,409,248 | 4/1995 | Williams ............................... 280/284 |
| 5,435,584 | 7/1995 | Buell ...................................... 280/284 |
| 5,441,292 | 8/1995 | Busby .................................... 280/284 |
| 5,460,396 | 10/1995 | Sutter et al. ........................... 280/284 |
| 5,474,318 | 12/1995 | Castellano ............................. 280/284 |
| 5,498,013 | 3/1996 | Hwang ................................... 280/283 |
| 5,553,881 | 9/1996 | Klassen et al. . |
| 5,611,557 | 3/1997 | Farris et al. ............................ 280/275 |
| 5,628,524 | 5/1997 | Klassen et al. . |
| 5,671,936 | 9/1997 | Turner ................................... 280/284 |
| 5,725,227 | 3/1998 | Mayer . |
| 5,791,674 | 8/1998 | D'Aluisio et al. ..................... 280/284 |
| 6,050,584 | 4/2000 | Sibson .................................... 280/283 |
| B1 5,474,318 | 12/1997 | Castellano ............................. 280/284 |

*Primary Examiner*—J. J. Swann
*Assistant Examiner*—L. Lum
*Attorney, Agent, or Firm*—Marks & Clerk

[57] ABSTRACT

A suspension system for mounting a rear wheel on a rigid bicycle frame comprises a rear swing arm assembly pivotally mounted on the main frame member, and a shock absorbing arm assembly having a first end pivotally mounted on the rear swing arm assembly and a second end pivotally mounted on the main frame member. The shock absorbing arm assembly includes a first spring and damper assembly presenting a first spring resistance, and a second spring and damper assembly presenting a second spring resistance having a substantially different magnitude than the first spring resistance. The first and second spring and damper assemblies are mounted in seriatim in the shock absorbing arm assembly in force transmitting relation between the first and second ends of the shock absorbing arm assembly. A rear wheel mount defines a rear wheel axis of rotation and is disposed on one of the rear swing arm assembly and the shock absorbing arm assembly adjacent the first end thereof, for arcuate movement of the rear wheel axis of rotation between a plurality of substantially vertically displaced positions. At least a portion of the forces transmitted from the rear swing arm assembly to the shock absorbing arm assembly as a consequence of the substantially vertical displacement of the rear wheel axis of rotation is transmitted through both of the first and second spring and damper assemblies, and is thus substantially precluded from reaching the rigid bicycle frame.

16 Claims, 4 Drawing Sheets

BICYCLE REAR SUSPENSION SYSTEM

FIELD OF THE INVENTION

This invention relates to a suspension system for bicycles and more particularly to suspension systems for mounting a rear wheel onto a bicycle, especially for downhill racing bicycles.

BACKGROUND OF THE INVENTION

In recent years, it has become commonplace to include suspension systems on bicycles, both for the front wheel and the rear wheel. Many different types of suspension systems exist, and most employ a spring and/or a damper of one type or another. Typically, front wheel suspension systems and rear wheel suspension systems are different one from the other in terms of specific design and construction. Rear wheel bicycle suspensions do not need to accommodate steering, but must be able to absorb a substantial amount of force, typically much more than the front wheel, as there is more weight distributed to the rear wheel, especially when accelerating.

In mountain biking and in downhill bicycle racing, it is extremely important that the rear wheel suspension be able to absorb a considerable amount of force in the event of the rear wheel impacting the ground, in order to protect the rider and to stabilize the kinetics of the bicycle, thus helping to maintain control of the bicycle. Indeed, with many prior art rear wheel suspension systems, it is common for the suspension system to "bottom out" due to the landing impact experienced by the rear wheel. In other words, the range of motion of the rear wheel suspension system is completely taken up, and any force that is not absorbed up to that point is then directly transmitted to the frame of the bicycle and, presumably, ultimately to the rider, which is extremely uncomfortable and could cause injury. Further, such extreme forces could easily change the kinetics of the moving bicycle, thus reducing the control that the rider has over the bicycle, which is unacceptable in mountain biking or downhill bicycle racing.

All known prior art rear wheel suspension systems, as discussed below, employ a single spring and/or damper arrangement to absorb shock. It is well known that a single spring and/or damper arrangement cannot absorb both low impact forces, such as those encountered while riding along slightly rough terrain, and also high impact forces, such as those encountered in rough terrain or when landing after being airborne. The use of a non-linear spring, or equivalent geometric system, helps accommodate this problem, but with unacceptable results. Further, while the simple compression or extension of a non-linear spring is adjustable, the non-linearity of such a spring is not adjustable. In other words, a suspension system employing a single spring, even a non-linear spring, has only a simple adjustment and, accordingly, can not be adjusted via "fine tuning" of the suspension system to properly absorb both low impact forces and high impact forces. Such fine tuning is extremely important in mountain biking and downhill bicycle racing, as it is dependent on the terrain and on the weight of the rider, among other factors.

DESCRIPTION OF THE PRIOR ART

U.S. Pat. No. 5,611,557 to FARRIS et al discloses a bicycle suspension system wherein the suspension system's characteristics change according to whether the rider is in a standing position or a sitting position. The FARRIS et al patent discloses several embodiments. The embodiments disclosed in FIGS. 1 through 4d each have only a single shock absorber or spring unit 42a through 42d. In the embodiment as illustrated in FIGS. 5a through 5f, there is a shock absorber 42e mounted between the main frame 20e and the rear swings arm 32e. Additionally, there is a spring 54e mounted within the compression strut 52e of the seat frame 22e. In the embodiment as illustrated in FIGS. 6a through 6c, there is a first shock absorber with hydraulically tuned characteristics 60f connected between the main frame 20f and the swing arm 32f. There is also a seat activated hydraulic cylinder 64f connected between the seat 24f and the main frame 20f. The shock absorber with hydraulically tuned characteristics 60f and the seat activated hydraulic cylinder 64f are connected in fluid communication one with the other such that, when the rider sits on the seat 24f, the pressure within the seat activated hydraulic cylinder 64f increases, thus increasing the pressure within the shock absorber with hydraulically tuned characteristics 60f. In the embodiment as illustrated in FIGS. 7a through 7e, a shock absorber with mechanically adjustable characteristics is mounted between the main frame 20g and the swing arm 32g. The hydraulics of the shock absorber 72g are altered by movement of a connecting link 44g, which is attached to a rocker arm 40g which is, in turn, attached to a pivotally mounted seat post which is spring biased by compression spring 70g. It can be seen that the FARRIS et al patent does not disclose a bicycle rear suspension system having two shock absorber/spring units connected essentially in series one with the other.

U.S. Pat. No. 5,335,929 to TAKAGAKI et al discloses a bicycle frame having a rigid triangular frame structure and a "V"-shaped rear fork member 14 and chain-stay 7 structure pivotally mounted at its lower end on a bracket lug 1 and pivotally mounted at its upper end via a triangular link 10 to the back end of a horizontal upper tube 5 of the rigid frame. A shock absorber cylinder assembly 11 is pivotally mounted at a forward end to a mounting bracket on the horizontal upper tube 5 of the frame and pivotally mounted at its second end onto the triangular link 10. The shock absorbing cylinder assembly 11 provides shock absorbtion for the rear wheel in a progressive manner to enhance suspension characteristics. In other words, the geometry of the various components is used to provide non-linear spring damping from a linear spring.

U.S. Pat. No. 5,553,881 and U.S. Pat. No. 5,628,524 to KLASSEN et al disclose a bicycle rear suspension system wherein a forward frame section 13 of a bicycle frame 10 has a rear suspension system 12 mounted thereon. The rear suspension 12 comprises a lower pivot assembly 30 pivotally mounted to the frame near the bottom thereof, an upper pivot assembly 32 pivotally mounted to the seat 2, and a rear swinging arm assembly 34 securely connected to the lower pivot assembly 30 and pivotally connected to the upper pivot assembly 32. Arcuate movement of the rear swinging arm assembly 34 causes corresponding pivotal movement of the upper pivot assembly 32 about a spindle 42, thus causing extension and compression of the single shock absorber 44. Dual eccentric crank mechanisms 38a and 38b are employed to provide desired control characteristics such that the rear wheel is directed along a pre-determined, "S"-shaped path that is configured to provide a chain-stay lengthening effect only at the points where it is needed to counter-balance the pedal inputs of the rider.

U.S. Pat. No. 625,456 to MILLS et al discloses a bicycle frame having a rigid section comprising a head tube 1, horizontal tube 2, a lower reach bar 3, and an upright seat post 4. Horizontal rear forks 9 are pivotally connected to the rigid frame at crank hanger 6. Rear inclined upright braces 14 are pivotally connected at their bottom ends to the rear forks 14 and pivotally connected at their top ends to an assembly comprising an adjustable head 17 and coupling link 18 that is pivotally connected to the seat post tube 4 at its top end. A single spring 22 is connected in tension between the frame at the crank hanger 6 and the coupling link 18 by means of an adjustable collar 20.

U.S. Pat. No. 2,283,671 to FINLAY el al discloses a spring suspension device for bicycles and motorcycles wherein a single spring is operatively interconnected between the seat post portion of the frame member 33 and the rear fork 24, which is pivotally mounted to the frame at the pedal shaft 34, via various geometrical arrangements.

U.S. Pat. No. 5,725,227 to MAYER discloses a suspension system for a bicycle wherein a frame assembly 12 has a rear frame assembly 44 pivotally mounted thereto. A single shock absorber 60 is pivotally connected between the frame assembly 12 and the rear frame portion 44 to absorb shocks.

U.S. Pat. No. 4,789,042 to PITTS discloses a constant tension device for use on a two-wheeled vehicle. No mention is made of a specific means for absorbing shock from rear wheel movement.

U.S. Pat. No. 381,941 to CHAN, U.S. Pat. No. 390,505 to SHIAU, and U.S. Pat. No. 390,506 to SHIAU all illustrate bicycle frames wherein a main rigid frame portion has a rear wheel frame portion pivotally mounted thereto, and with a single shock absorber arrangement used to absorb shock due to movement of the rear wheel frame portion.

SUMMARY OF THE INVENTION

In accordance with one aspect of the present invention, there is provided a suspension system for mounting a rear wheel on a rigid bicycle frame. The suspension system comprises a rear swing arm assembly pivotally mounted on the main frame member, and a shock absorbing arm assembly having a first end pivotally mounted on the rear swing arm assembly and a second end pivotally mounted on the main frame member. The shock absorbing arm assembly includes a first spring and damper assembly presenting a first spring resistance, and a second spring and damper assembly presenting a second spring resistance having a substantially different magnitude than the first spring resistance. The first and second spring and damper assemblies are mounted in seriatim in the shock absorbing arm assembly in force transmitting relation between the first and second ends of the shock absorbing arm assembly. A rear wheel mount defines a rear wheel axis of rotation and is disposed on one of the rear swing arm assembly and the shock absorbing arm assembly adjacent the first end thereof, for arcuate movement of the rear wheel axis of rotation between a plurality of substantially vertically displaced positions. At least a portion of the forces transmitted from the rear swing arm assembly to the shock absorbing arm assembly as a consequence of the substantially vertical displacement of the rear wheel axis of rotation is transmitted through both of the first and second spring and damper assemblies, and is thus substantially precluded from reaching the rigid bicycle frame.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
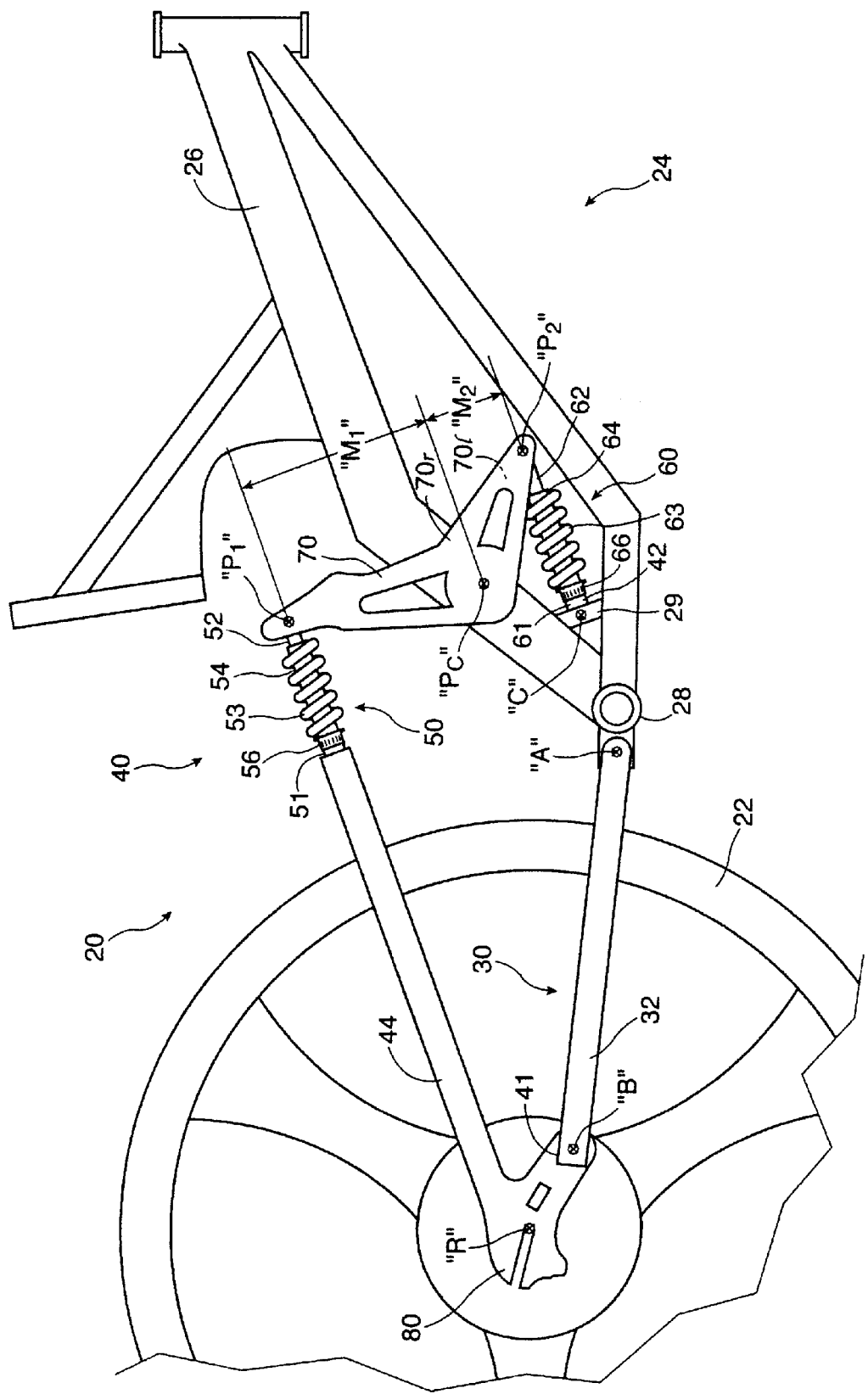
FIG. 1 is a side elevational view of a bicycle including the preferred embodiment of the suspension system according to the present invention.

Reference will now be made to FIGS. 1 through 5 of the preferred embodiment of the suspension system of the present invention, as indicated by the general reference numeral 20. The suspension system 20 is for mounting a rear wheel 22 on a rigid bicycle frame 26 of a bicycle, as indicated by the general reference numeral 24.

The suspension system 20 comprises a rear swing arm assembly, as indicated by the general reference numeral 30, which rear swing arm assembly 30 comprises a single rear swing arm 32 pivotally mounted on the bicycle frame 26 so as to be substantially horizontally disposed and extending rearwardly from the pivot axis "A", immediately behind the bottom bracket shell 28 (crank arms and pedals not shown).

As can be best seen in FIG. 1, a shock absorbing arm assembly, as indicated by the general reference numeral 40, has, in seriatim, a first end 41, an extension portion 44, a first spring and damper assembly, as indicated by the general reference numeral 50, a linking arm assembly 70, and a second spring and damper assembly, as indicated by the general reference numeral 60.

The first end 41 of the shock absorbing arm assembly 40 is pivotally mounted on the rear swing arm assembly, at axis "B", and the second end 42 of the shock absorbing arm assembly 40 is pivotally mounted on the main frame member, at axis "C", on a short cross-brace member 29 welded in place on the bicycle frame 26. The first spring and damper assembly 50 includes a first end 51, a second end 52, a first spring member 53, a first hydraulic damper 54, and an integral adjustment mechanism 56. In the preferred embodiment, the first spring member 53 is in compression, but does not need to be so. The amount of initial compression of the first spring member 53 and, therefore, the amount of initial resistance offered by the first spring member 53, is adjustable by means of the integral adjustment mechanism 56. The first spring and damper assembly 50 presents a first spring resistance as determined by the spring constant of the first spring member 53, the amount of initial compression as determined by the adjustment mechanism 56, and also by the geometry of the shock absorbing arm assembly 40, as will be discussed in greater details subsequently. Moreover, the first spring member 53 can also be replaced by an adjustable air spring, as is well known to those skilled in the art.

The second spring and damper assembly 60 includes a first end 61, a second end 62, a second spring member 63, a second hydraulic damper 64, and an integral adjustment mechanism 66. In the preferred embodiment, the second spring member 63 is in compression, but does not need to be so. The amount of initial compression of the second spring member 63 and, therefore, the amount of initial resistance offered by the second spring member 63, is adjustable by means of the integral adjustment mechanism 66. The second spring and damper assembly 60 presents a second spring resistance, as determined by the spring constant of the second spring member 63, the amount of initial compression as determined by the adjustment mechanism 66, and also by the geometry of the shock absorbing arm assembly 40. Likewise, as with first spring member 53, the second spring member 63 can be replaced by an adjustable air spring, as is well known to those skilled in the art.

The first spring resistance has a substantially different magnitude than the second spring resistance. In the preferred embodiment, the first spring resistance presented by the first spring and damper assembly 50 is greater than the second spring resistance of the second spring and damper assembly 60 presented by the first spring and damper assembly 50. In this manner, the first spring resistance can be selected to absorb low impact forces, such as those encountered while riding along slightly rough terrain; and the first spring and damper assembly 50 can be selected, and also adjusted to the weight of the rider, to absorb high impact forces, such as those encountered in rough terrain or when landing after being airborne, as will be discussed in greater detail subsequently.

The first and second spring and damper assemblies 50, 60 are mounted in seriatim in the shock absorbing arm assembly 40 in force transmitting relation between the first end 41 and the second end 42 of the shock absorbing arm assembly 40. In the preferred embodiment, the first spring and damper assembly 50 is securely connected at its first end 51 to the extension portion 44 so as to be disposed nearer the first end 41 of the shock absorbing arm assembly 40 than is the second spring and damper assembly 60. The second spring and damper assembly 60 is securely connected at its first end 61 to the second end 42 of the shock absorbing arm assembly 40, and is therefore disposed nearer the second end 42 of the shock absorbing arm assembly 40. Accordingly, low impact bumps are absorbed by the first spring and damper assembly 60 without being transmitted to the more resistive second spring and damper assembly 50.

The shock absorbing arm assembly 40 further includes a linking arm assembly 70 comprising substantially "V"-shaped left and right linking arms 70l and 70r, each having a first end 71 and a second end 72, and pivotally mounted adjacent the vertex of the "V"-shape for on the left and right sides of the bicycle frame 26, respectively, for pivotal movement about a central pivot axis "$P_c$". Alternatively, the linking arm assembly could comprise a single arm member pivotally mounted on one side of the bicycle frame 26. The linking arm assembly 70 is mounted in the shock absorbing arm assembly 40 in seriatim with, and between, the first spring and damper assembly 50 and the second spring and damper assembly 60.

The first spring and damper assembly 50 is pivotally connected at its second end 52 in secured relation between the left linking arm 70l and the right linking arm 70r— or to a single linking arm, when used—, at their respective first ends 71, for relative pivotal movement one with respect to the other about a first pivot axis "$P_1$". Similarly, the second spring and damper assembly 60 is pivotally connected at its second end 62 in secured relation between the left linking arm 70l and the right linking arm 70r, at their respective second ends 72, for relative movement one with respect to the other about a second pivot axis "$P_2$".

As can be seen in FIGS. 1 through 5, a first moment arm "$M_1$" is defined between the first pivot axis "$P_1$" and the third pivot axis "$P_c$." Similarly, a second moment arm "$M_2$" is defined between the second pivot axis "$P_2$" and the third pivot axis "$P_c$". The first moment arm "$M_1$" is substantially greater than the second moment arm "$M_2$", with the ratio of the first moment arm "$M_1$" to the second moment arm "$M_2$" being from about 2:1 to about 5:1 and, in the preferred embodiment, being about 3:1. In this manner, the first spring and damper assembly 50 and the second spring and damper assembly 60 can be similar one to the other, in terms of the spring constant of the respective spring members 53 and 63, yet there can be a necessary difference in the first and second spring resistances offered by the first spring and damper assembly 50 and the second spring and damper assembly 60, respectively, as a result of the difference in the first moment arm "$M_1$" and the second moment arm "$M_2$". In the preferred embodiment, since the first moment arm "$M_1$" is about three times the length of the second moment arm "$M_2$", the force exerted on the second spring and damper assembly 60 is about three times the force exerted on the first spring and damper assembly 50. Accordingly, the second spring and damper assembly 60 compresses first, thus allowing it to absorb low impact bumps, as discussed above.

The advantage of configuring the shock absorbing arm assembly 40 as such—that is to say, having the first and second spring and damper assemblies 50 and 60 similar one to other, with the respective spring members 53 and 63 having essentially the same spring constants—is that two of the same "off-the-shelf" components can be used for the first and second spring and damper assemblies 50 and 60, thus potentially reducing manufacturing and assembly costs, and so on.

A rear wheel mount 80 defining a rear wheel axis of rotation "R" is disposed on one of the rear swing arm assembly 30 and the shock absorbing arm assembly 40. In the preferred embodiment, the rear wheel mount 80 is disposed on the shock absorbing arm assembly 40 adjacent the first end 41 of the shock absorbing arm assembly 40, in any event between the first end 41 of the shock absorbing arm assembly 40 and the first spring and damper assembly 50.

Figure 6:
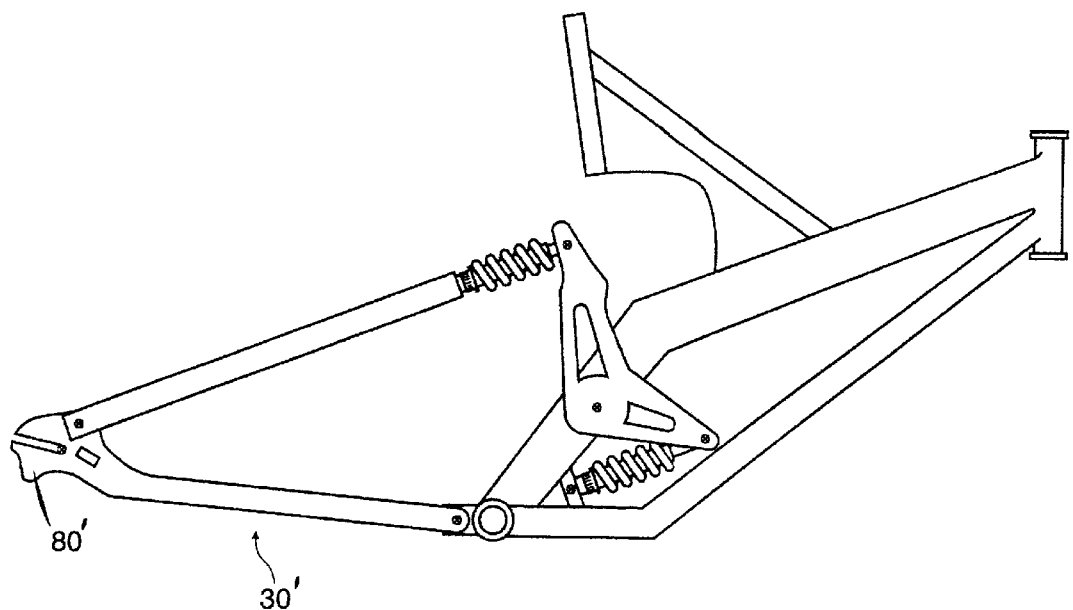
FIG. 6 is a first alternative embodiment of the suspension system according to the present invention.

Alternatively, as can be seen in FIG. 6 which shows a first alternative embodiment, the rear wheel mount 80' can be disposed on the rear swing arm assembly 30'. In either case, the rear wheel mount 80 (or 80') is disposed for arcuate movement of the rear wheel axis of rotation "R" between a plurality of substantially vertically displaced positions, as would occur during riding over uneven terrain or during landing after being airborne.

Figure 2:
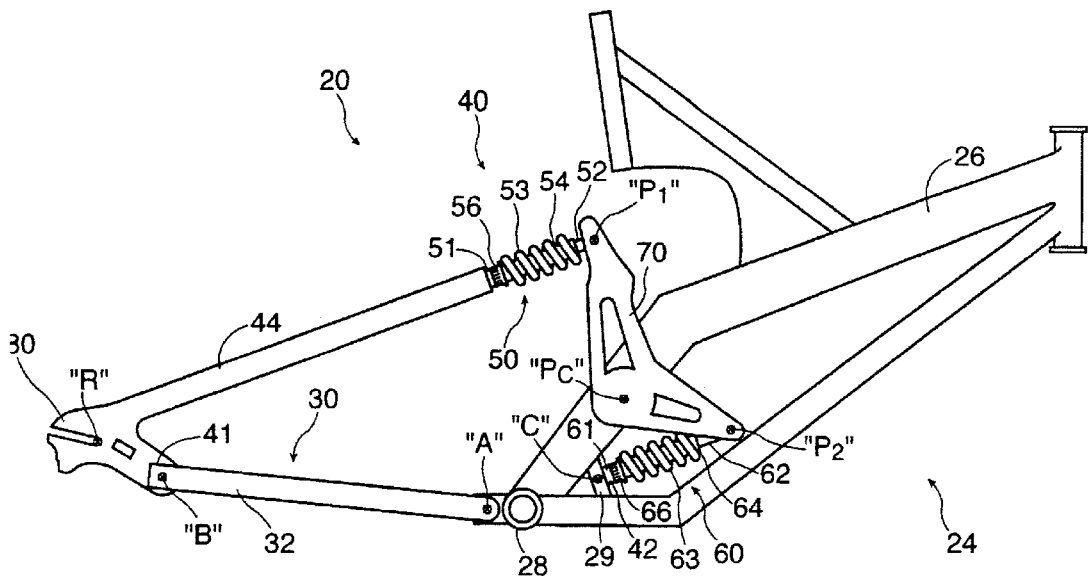
FIG. 2 is an enlarged side elevational view similar to FIG. 1, with some details omitted for the sake of clarity, and with the suspension system in a rest position.

Reference will now be made to FIGS. 2 through 5, which illustrate the suspension system 20 of the present invention in use. Although not specifically shown, for the purpose of the following discussion, it is assumed that there is a rider on the bicycle 24. Accordingly, the weight of the rider would initially compress each of the first spring and damper assembly 50 and the second spring and damper assembly 60 slightly to an initially compressed configuration. The following discussion assumes that the initially compressed configuration of the first spring and damper assembly 50 and the second spring and damper assembly 60 corresponds to an in-use rest position of the suspension system 20, as can be seen in FIG. 2, and that the subsequent compression of the first spring and damper assembly 50 and the second spring and damper assembly 60 is relative to the initially compressed configuration of the first spring and damper assembly 50 and the second spring and damper assembly 60.

As can be seen in FIG. 2, the suspension system 20 is in its rest position, such as would be experienced when the bicycle 24 is stationary or is moving over even terrain and there is virtually no arcuate movement of the rear wheel axis of rotation "R" about the pivot axis "A" and, accordingly, there is virtually no vertical displacement of the rear wheel axis of rotation "R". Therefore, there is virtually no corresponding compression of the first spring and damper assembly 50 and very minimal no corresponding compression of the second spring and damper assembly 60.

Figure 3:
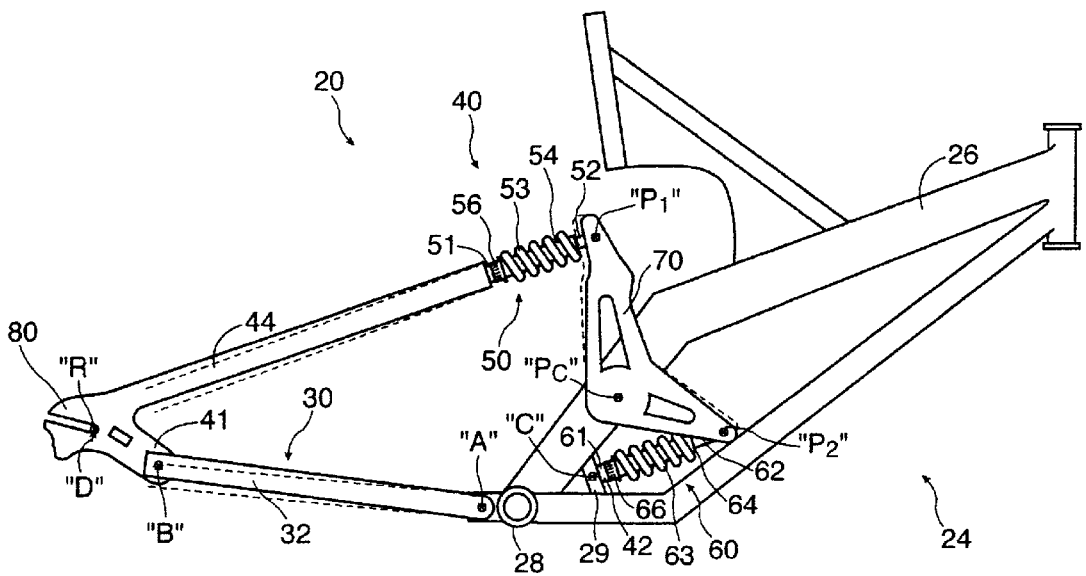
FIG. 3 is a side elevational view similar to FIG. 2, with the suspension system partially shown in ghost lining in the rest position of FIG. 2, and shown in solid lining with the first spring and damper assembly of the suspension system partially compressed.

As can be seen in FIG. 3, the rear wheel axis of rotation "R" has experienced slight arcuate movement, as indicated by arrow "D", and, accordingly, is slightly vertically displaced. Correspondingly, the second spring and damper assembly 60 is partially compressed and the first spring and damper assembly 50 is compressed very minimally—it is virtually not compressed—because the second spring and damper assembly 60 presents a second spring resistance that is substantially lower than the first spring resistance presented by the first spring and damper assembly 50. Accordingly the linking arm assembly 70 rotates slightly from its rest position, as shown in solid lining in FIG. 2 and in ghost outline in FIG. 3, to a position as shown in solid lining in FIG. 3. This situation would typically arise when riding on slightly bumpy terrain.

Figure 4:
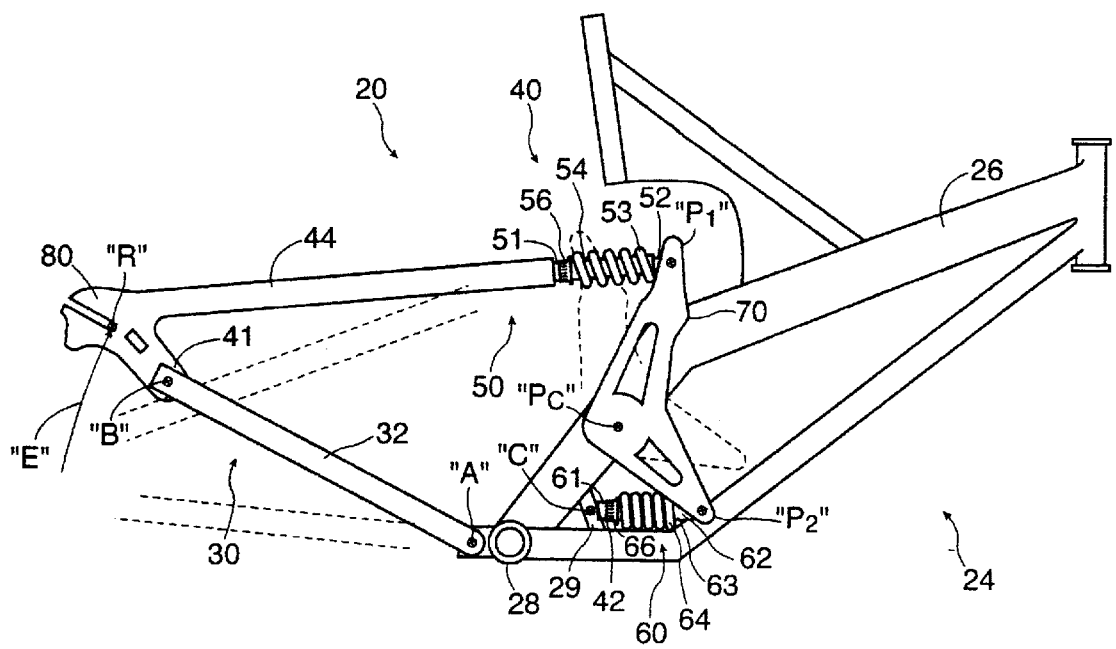
FIG. 4 is a side elevational view similar to FIG. 2, with the suspension system partially shown in ghost lining in the rest position of FIG. 2, and shown in solid lining with the first spring and damper assembly of the suspension system fully compressed and the second spring and damper assembly slightly compressed.

As can be seen in FIG. 4, the rear wheel axis of rotation "R" has gone through substantially more arcuate movement than is shown in FIG. 3, as indicated by arrow "E", and, therefore, is substantially more vertically displaced. Accordingly, the second spring and damper assembly 60 is fully compressed and has, therefore, absorbed all of the force that it can. Therefore, any additional force is absorbed by the first spring and damper assembly 50 and, as can be seen in FIG. 4, the first spring and damper assembly 50 is somewhat compressed. This situation would typically arise when riding on somewhat rough terrain and can be seen to be extremely advantageous over prior art suspension systems having a single spring and damper assembly in that the forces absorbed were too great to be completely absorbed by the second spring and damper assembly 60 and otherwise would have been partially passed on to the bicycle frame 26 and, ultimately, to the rider. Instead, the first spring and damper assembly 50 has absorbed the force that could not be absorbed by the second spring and damper assembly 60, thus still "cushioning" the rider.

Figure 5:
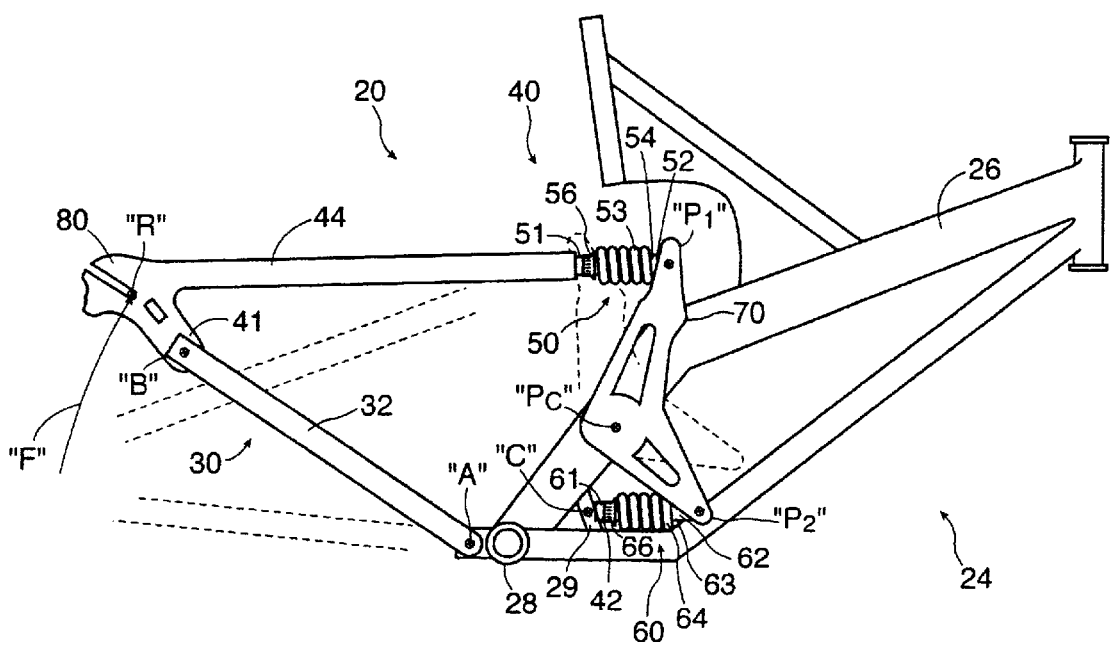
FIG. 5 is a side elevational view similar to FIG. 2, with the suspension system partially shown in ghost lining in the rest position of FIG. 2, and with the first spring and damper assembly of the suspension system fully compressed and the second spring and damper assembly almost fully compressed.

Finally, as can be seen in FIG. 5, the rear wheel axis of rotation "R" has experienced extreme arcuate movement and corresponding extreme vertical displacement, as indicated by arrow "F". Accordingly, the second spring and damper assembly 60 has been fully compressed and the first spring and damper assembly 50 has been almost fully compressed. Such a situation would be encountered perhaps when the bicycle 24 lands after being airborne. The first spring and damper assembly 50 has been adjusted according to the weight of the rider so as to compress substantially upon the bicycle 24 landing after being airborne, but not to "bottom out" except in the most forceful of landings. In complete contrast, such a severe landing with a bicycle having a prior art single spring and damper assembly would jolt the rider quite significantly, and possibly injure the rider, or cause loss of control of the bicycle.

Figure 7:
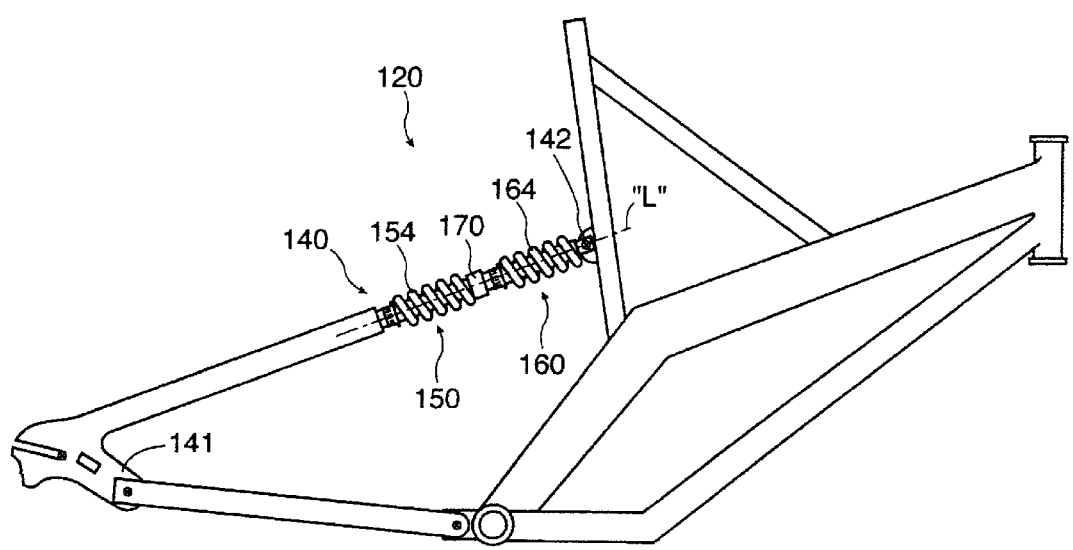
FIG. 7 is a second alternative embodiment of the suspension system according to the present invention.

Reference will now be made to FIG. 7 which shows a second alternative embodiment of the suspension system according to the present invention, as indicated by the general reference numeral 120. In the suspension system 120, the first end 141 of the shock absorbing arm assembly 140 remains in the same place as in the preferred embodiment suspension system 20. The first spring and damper assembly 150 and the second spring and damper assembly 160 are each disposed along a single line of action "L", and are retained in place one with respect to the other by a linking collar 170. The second end 142 of the shock absorbing arm assembly 140 has been relocated to accommodate the linear positioning and action of the first spring and damper assembly 150 and the second spring and damper assembly 160. In this embodiment, the first spring resistance is greater than the second spring resistance and, accordingly, the spring constant of the first spring member 154 in the first spring and damper assembly 150 is greater than the spring constant of the second spring member 164 in the second spring and damper assembly 160.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially", when used with an adjective or adverb, is intended to enhance the scope of the particular characteristic; e.g., substantially vertical is intended to mean vertical, nearly vertical, and/or exhibiting characteristics associated with being in a vertical orientation. Similarly, the use of the word "about" is intended to convey that a range which is defined may be extended somewhat beyond the lower and upper limits that have been defined, so that the expression of a range of values is intended to be informative as to its scope, but not literal.

What is claimed is:

1. A suspension system for mounting a rear wheel on a rigid bicycle frame, said suspension system comprising:
   a rear swing arm assembly pivotally mounted on a main frame member;
   a shock absorbing arm assembly having a first end pivotally mounted on said rear swing arm assembly and a second end pivotally mounted on said main frame member;
   said shock absorbing arm assembly including a first spring and damper assembly presenting a first spring resistance, and a second spring and damper assembly presenting a second spring resistance having a different magnitude than said first spring resistance, wherein said first and second spring and damper assemblies are mounted in seriatim in said shock absorbing arm assembly in force transmitting relation between said first and second ends of said shock absorbing arm assembly;

a rear wheel mount defining a rear wheel axis of rotation and disposed on one of said rear swing arm assembly and said shock absorbing arm assembly adjacent said first end thereof, for movement of said rear wheel axis of rotation between a plurality of substantially vertically displaced positions;

wherein forces are transmitted from said rear swing arm assembly to said shock absorbing arm assembly, and at least a portion of those forces are transmitted as a consequence of the substantially vertical displacement of said rear wheel axis of rotation, said portion being transmitted through both of said first and second spring and damper assemblies, and is thus substantially precluded from reaching said rigid bicycle frame.

2. The suspension system of claim 1, wherein said rear swing arm assembly comprises a single rear swing arm.

3. The suspension system of claim 1, wherein said first spring resistance is greater than said second spring resistance.

4. The suspension system of claim 1, wherein said shock absorbing arm assembly further includes a linking arm assembly mounted in said shock absorbing arm assembly in seriatim with, and between, said first and second spring and damper assemblies.

5. The suspension system of claim 1, wherein said first end of said shock absorbing arm assembly, said first spring and damper assembly, said second spring and damper assembly, and said second end of said shock absorbing arm assembly are each disposed along a single line of action.

6. The suspension system of claim 2, wherein said single rear swing arm is substantially horizontally disposed.

7. The suspension system of claim 6, wherein said rear wheel mount is disposed on said shock absorbing arm assembly between said first end of said shock absorbing arm assembly and said first and second spring and damper assemblies.

8. The suspension system of claim 6, wherein said rear wheel mount is disposed on said rear swing arm assembly.

9. The suspension system of claim 3, wherein said first spring and damper assembly is mounted so as to be closer to said first end of said shock absorbing arm assembly than the second spring and damper assembly, and said second spring and damper assembly is mounted so as to be closer to said second end of said shock absorbing arm assembly than the first spring and damper assembly.

10. The suspension system of claim 4, wherein said linking arm assembly is pivotally connected to said first spring and damper assembly for relative pivotal movement one with respect to the other about a first pivot axis, and is pivotally connected to said second spring and damper assembly for relative pivotal movement one with respect to the other about a second pivot axis, and is pivotally mounted on said bicycle frame for pivotal movement about a central pivot axis, thus defining a first moment arm between said first and central pivot axes and a second moment arm between said second and central pivot axes.

11. The suspension system of claim 10, wherein first moment arm is substantially greater than said second moment arm.

12. The suspension system of claim 10, wherein said linking arm assembly comprises left and right linking arms.

13. The suspension system of claim 10, wherein said linking arm member is substantially "V"-shaped having a vertex, and said central pivot axis is disposed adjacent the vertex of the "V"-shape.

14. The suspension system of claim 11, wherein the ratio of said first moment arm to said second moment arm is from about 2:1 to about 5:1.

15. The suspension system of claim 11, wherein said first spring and damper assembly and said second spring and damper assembly are similar one to the other.

16. The suspension system of claim 14, wherein the ratio of said first moment arm to said second moment arm is about 3:1.

* * * * *